United States Patent [19]

Itabashi

[11] 4,443,076
[45] Apr. 17, 1984

[54] PROJECTING APPARATUS
[75] Inventor: Tatsuo Itabashi, Kanagawa, Japan
[73] Assignee: Mitutoyo Mfg. Co., Ltd., Tokyo, Japan
[21] Appl. No.: 434,242
[22] Filed: Oct. 14, 1982
[30] Foreign Application Priority Data
  Oct. 20, 1981 [JP] Japan ............................... 56-167524
  Oct. 20, 1981 [JP] Japan ............................... 56-167525
[51] Int. Cl.³ ............................................... G03B 3/10
[52] U.S. Cl. ..................... 353/101; 353/63; 353/80; 350/519
[58] Field of Search ................. 353/39, 101, 102, 100, 353/80, 63; 350/526, 523, 508, 519; 355/56; 356/391

[56] References Cited
U.S. PATENT DOCUMENTS

| 1,826,828 | 10/1931 | Schoof | 356/391 |
| 3,549,250 | 12/1970 | Pantenburg | 353/101 X |
| 3,619,035 | 11/1971 | Hopkins | 350/519 X |
| 3,679,287 | 7/1972 | Takahashi et al. | 350/526 |
| 3,833,282 | 9/1974 | Kappl et al. | 350/520 |
| 3,840,291 | 10/1974 | Littman et al. | 350/519 X |
| 4,241,251 | 12/1980 | Yonekubo | 350/526 X |

FOREIGN PATENT DOCUMENTS 2946927 5/1981 Fed. Rep. of Germany ...... 350/526

Primary Examiner—Harry N. Haroian
Attorney, Agent, or Firm—Koda and Androlia

[57] ABSTRACT

A projecting apparatus wherein a work on a mount is illuminated by an illuminating device and an image of the shape of the work obtained through a light transmitted therethrough or reflected therefrom is formed on a screen by means of a magnifying-projecting device, characterized in that condensing lenses in the illuminating device and projecting lenses in the magnifying-projecting device are formed into zoom type lenses and a tuning device is provided for causing the illuminating scope of the condensing lenses in the illuminating device to correspond to the projecting magnification of the projecting lenses in the magnifying-projecting device.

9 Claims, 10 Drawing Figures

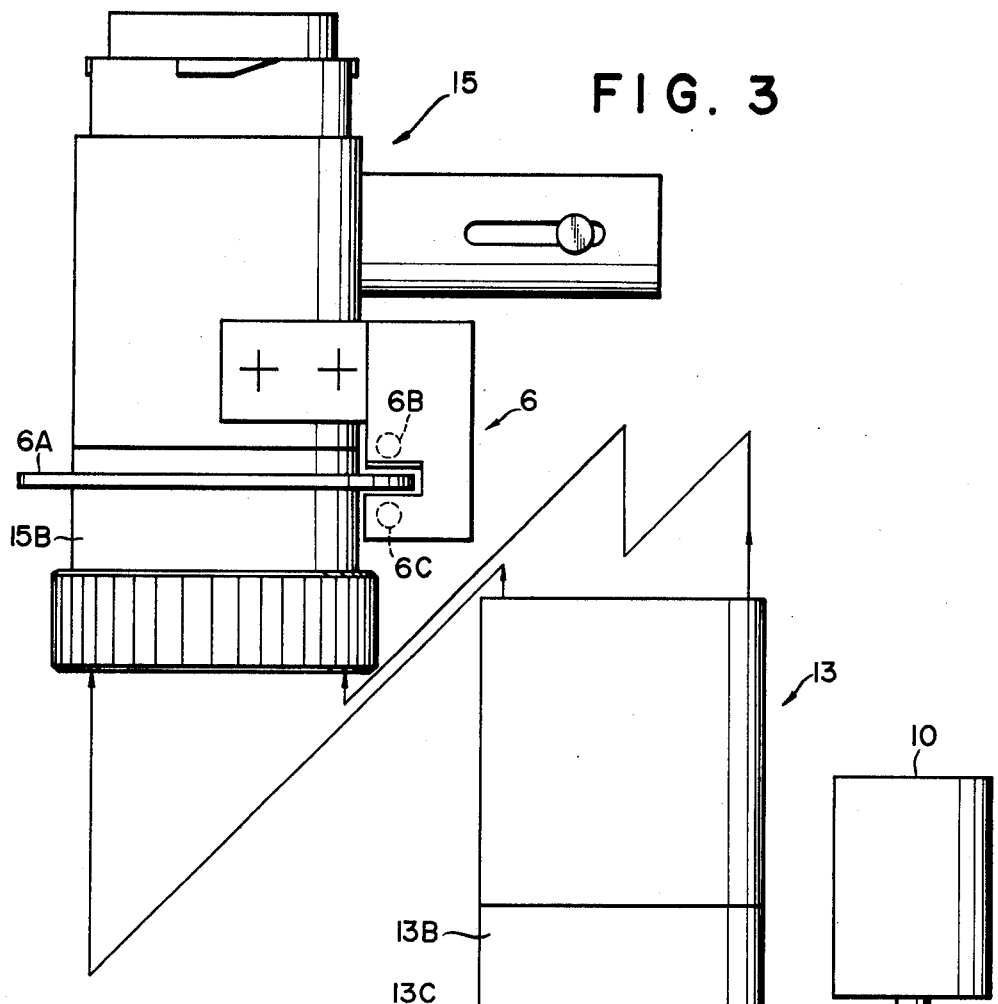
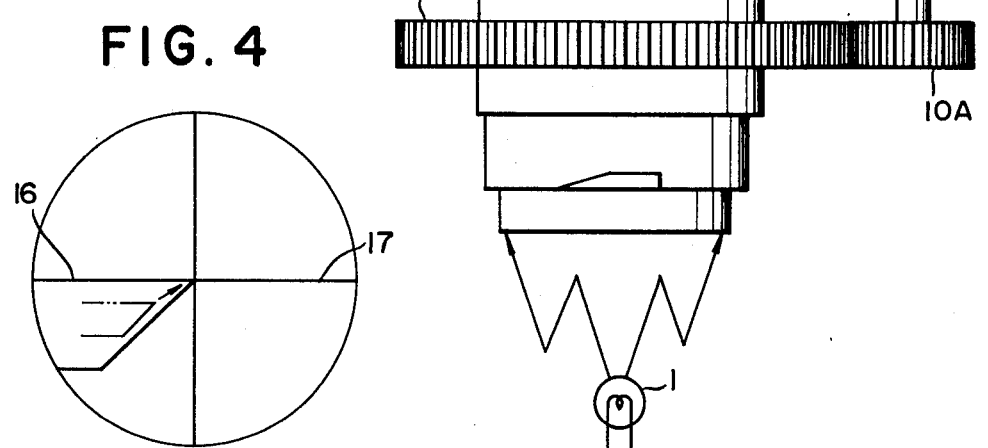
FIG. 3
FIG. 4

PROJECTING APPARATUS

BACKGROUND OF THE INVENTION

1. Field of the Invention

This invention relates to improvements in a projecting apparatus to magnify and project a point of a cutting bit of a machine tool, a gear or the like for inspection.

2. Description of the Prior Art

As shown in FIG. 1, heretofore, there has been used a projecting apparatus comprising: a light source 1; a mount 2, onto which a work is monuted; an illuminating device 3 including condensing lenses, for illuminating said work rested on said mount 2; and a projecting device 5 including projecting lenses, for magnifying the shape of the work and forming an image thereof on a screen 4 by utilizing a light reflected from or transmitted through said work.

In the conventional projecting apparatus of the type described, in order to change the magnification of an image of the work formed on the screen 4, the projecting lenses in the projecting device 5 should be replaced by other ones, gradually varying the magnification to 5, 10, 20, 50 times and so forth, for example.

However, in the above-described construction to change the magnifications, a desired magnification is not obtainable because the set magnification is fixed. So, each time the projecting lenses are replaced, the illuminating device 3 should be adjusted to obtain an illuminating device corresponding to the set magnification of the projecting lenses, thus presenting such disadvantages that complicated work is required, the projecting lenses in the projecting device 5 should be provided to meet the number of magnifications to be changed and the construction to change the magnifications becomes complicated in arrangement and large-sized as a whole.

SUMMARY OF THE INVENTION

It is therefore the primary object of the present invention to provide a projecting apparatus capable of obtaining a desired magnification, readily obtaining illuminating beams of an optimum illuminating system in accordance with the magnification.

It is an another object of the present invention to provide a projecting apparatus capable of rendering the apparatus simplified in construction and a compact in size.

It is a further object of the present invention to provide a projecting apparatus capable of obtaining a desired magnification, readily obtaining illuminating beams of an optimum illuminating system in accordance with the magnification, eliminating adjustment of illuminating system for each replacement of the projecting lenses as in the proir art.

To achieve one of the above-described objects, the present invention comprises: a light source; a mount, onto which a work is mounted; an illuminating device including zoom type condensing lenses, for illuminating the work rested on the mount; and a projecting device including zoom type projecting lenses, for magnifying the shape of the work and forming an image thereof on a screen by utilizing a light reflected from or transmitted through said work.

To achive one of the above-described objects, according to the present invention, in a projecting apparatus wherein a work rested on a mount is illuminated by an illuminating device and an image of the shape of the work obtained through a light transmitted therethrough or reflected therefrom is formed on a screen by means of a magnifying-projecting device, condensing lenses in illuminating device and projecting lenses in the magnifying-projecting device are formed into zoom type lenses and tuning device provided for causing the illuminating device to correspond to the porjecting magnification of the projecting lenses in the magnifying-projecting device.

To achieve one of the above-described objects, according to the present invention, in the aforesaid projecting apparatus, the tuning device comprises: a magnification setter; an actuator to actuate the projecting lenses in response to a magnification signal from the magnification setter; and an actuator to actuate the condensing lenses in response to the magnification signal.

To achieve one of the above-described objects, according to the present invention, in the aforesaid projecting apparatus, the tuning device comprises: a detecting device secured to one side of either the projecting lenses or the condensing lenses, for detecting a magnification or an illuminating scope; and an actuator to actuate the other side of either the projecting lenses or the condensing lenses in response to a detection signal from the detecting device, and to set an illuminating scope or a magnification corresponding to the magnification or the illuminating scope thus detected.

To achieve one of the above-described objects, according to the present invention, in the aforesaid projecting apparatus, the tuning device comprises: a magnification setter; an actuator to actuate one side of either the projecting lenses or the condensing lenses in response to a mangification signal from the magnification setter; a detecting device secured to the projecting lenses or the condensing lenses actuated by the actuator, for detecting a magnification or an illuminating scope thereof; and an actuator to actuate the other side of either the condensing lenses or the projecting lenses in response to a detection signal from the detecting device, and to set an illuminating scope or a magnification corresponding to the magnification or the illuminating scope thus detected.

To achieve one of the above-described objects, according to the present invention, in the aforesaid apparatus, the actuator feeds a correction signal back to thereby be controlled, after the detection signal from the detecting device to detect a magnification or an illuminating scope, secured to either the projecting lenses or the condensing lenses and actuated by the actuator has been compared with a reference signal by a comparator.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 3 is a disassembled side view enlargedly showing the essential portions of the aforesaid embodiment;

FIG. 4 is a plan view showing action of the aforesaid embodiment;

DETAILED DESCRIPTION OF THE INVENTION EMBODIMENT

Description will hereunder be given of an embodiment of the present invention with reference to the drawings.

Figure 1:
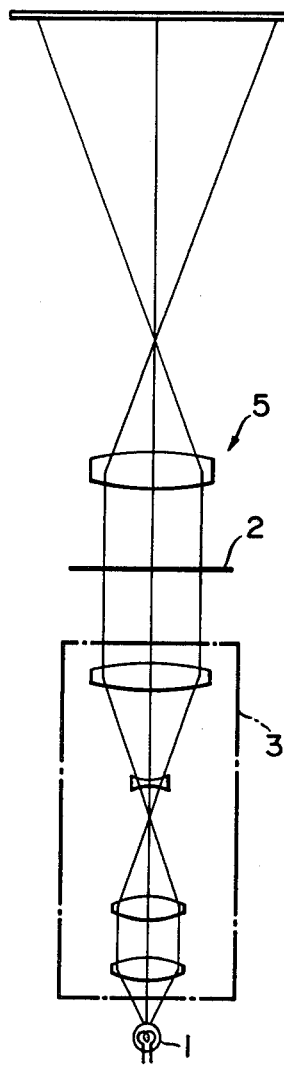
FIG. 1 is an arrangement view showing an optical system in the conventional projecting apparatus.

In the present embodiment, same reference numerals of the conventional projecting apparatus as shown in FIG. 1 are used to designate the same or similar parts.

Figure 2:
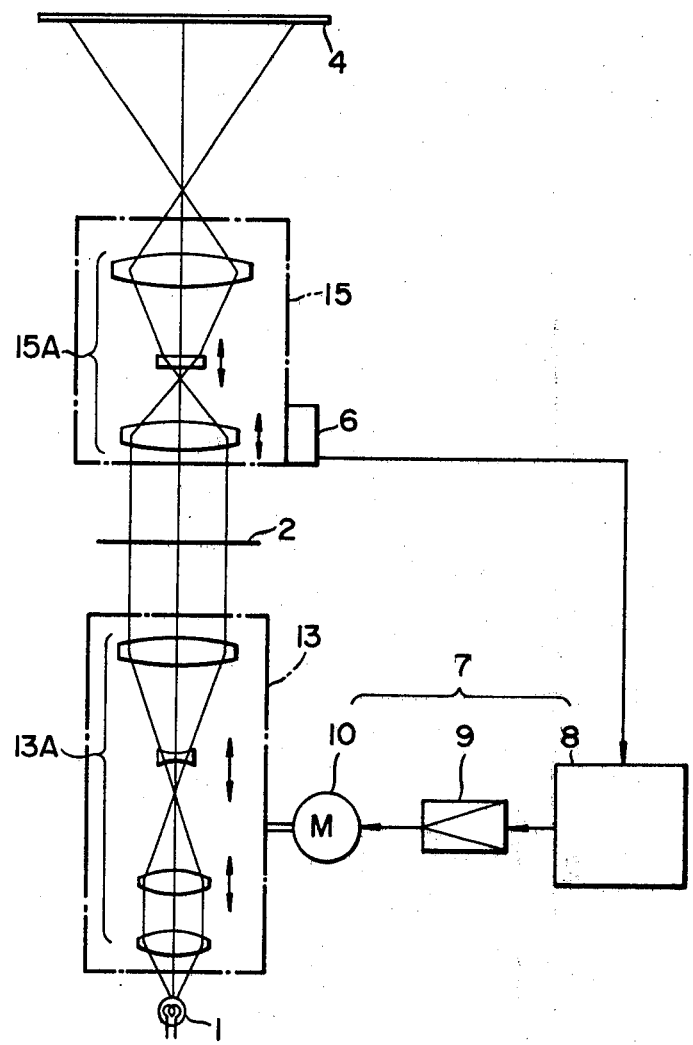
FIG. 2 is an arrangement view, partially including a block diagram, showing an optical system of in an embodiment the projecting apparatus according to the present invention.

As shown in FIG. 2, in the present embodiment, the projecting apparatus comprises: a light source 1; a mount 2, onto which a work is mounted; an illuminating device 13 including zoom type condensing lenses 13A, for illuminating the work rested on the mount 2; a projecting device 15 including zoom type projecting lenses 15A, for magnifying the shape of the work and forming an image thereof on a screen 4 by utilizing a light reflected from or transmitted through the work; a magnification detector 6 to detect a set magnification of the zoom type projecting lenses 15A; and a tuning device 7 to drive and set the zoom type condensing lenses 13A at a position within an illuminating scope corresponding to the set magnification of the zoom type projecting lenses detected by the magnification detector 6.

The zoom type projecting lenses 15A in the aforesaid projecting device 15 are driven by manual operation in accordance with a gradation or an image formed on the screen 4, whereby the magnification thereof is set.

As shown in FIG. 3, the magnification detector 6 comprises: a slit disk 6A coaxially provided on a rotary lens tube 15B of the zoom type projecting lenses in the projecting device 15; and a light emitting element 6B and a light receiving element 6C arranged upwardly and downwardly of an optical lattice formed on the slit disk 6A; and a magnification indicating signal corresponding to the magnification of the zoom type projecting lenses 15A is sensed from a rotary angle of the rotary lens tube 15B, to thereby detect the set magnification of the zoom type projecting lenses.

The aforesaid tuning device 7 comprises: an arithmetic unit 8; an amplifier 9; and a motor 10.

The arithmetic unit 8 emits a driving signal in response to a detection signal from the magnification detecting device 6, to thereby cause the illuminating scope of the zoom type condensing lenses 13A in the illuminating device 13 to correspond to the set magnification of the zoom type projecting lenses 15A detected by the magnification detecting device 16.

The amplifier 9 amplifies an output signal from the arithmetic unit 8 and emits the signal thus amplified to the motor 10. In response to the signal thus fed, the motor 10 drives a gear 13 C integrally formed on the rotary lens tube 13B the zoom type condensing lenses 13A in the illuminating device 13 by means of a drive gear 10A, to thereby set the gear 13C to a position where illuminating beams corresponding to the magnification of the zoom type projecting lenses 15A illuminate the work on the mount 2.

In the present embodiment, since both the illuminating device 13 and the projecting device 15 are made of the zoom type, a desired magnification is obtainable and no replacement of the projecting lenses is required, thus enabling to offer such advantages that need for troublesome adjustment of the illuminating system for each replacement of the lenses as in the prior art is eliminated, and the apparatus is rendered simple in construction and compact in size.

Furthermore, in the case of using the zoom type projecting lenses 15A as described above, when a point of a cutter bit 16 is to be aligned with a hair line 17 as shown in FIG. 4, the point of the cutter bit 16 can be easily aligned with the hair line 17 simply by changing the magnification of the zoom type projecting lenses 15A without requiring to move the cutter bit 16 rested on the mount 2, thus enabling to offer such an advantage that inspection of a nose angle of the cutter bit 16 and the like can be readily and quickly performed.

Further in the above-described embodiment, the tuning device 7 to drive the zoom type condensing lenses 13A in the illuminating device 13 comprises: an arithmetic unit 8; an amplifier 9; and a motor 10. However, the tuning device 7 may be replaced by and one which can drive the zoom type condensing lenses 13A in response to a detection signal from the magnification detecting device 6, so as to obtain irradiating beams corresponding to the set magnification of the zoom type projecting lenses 15A, but, need not necessarily restricted by the construction of the embodiment.

Figure 5:
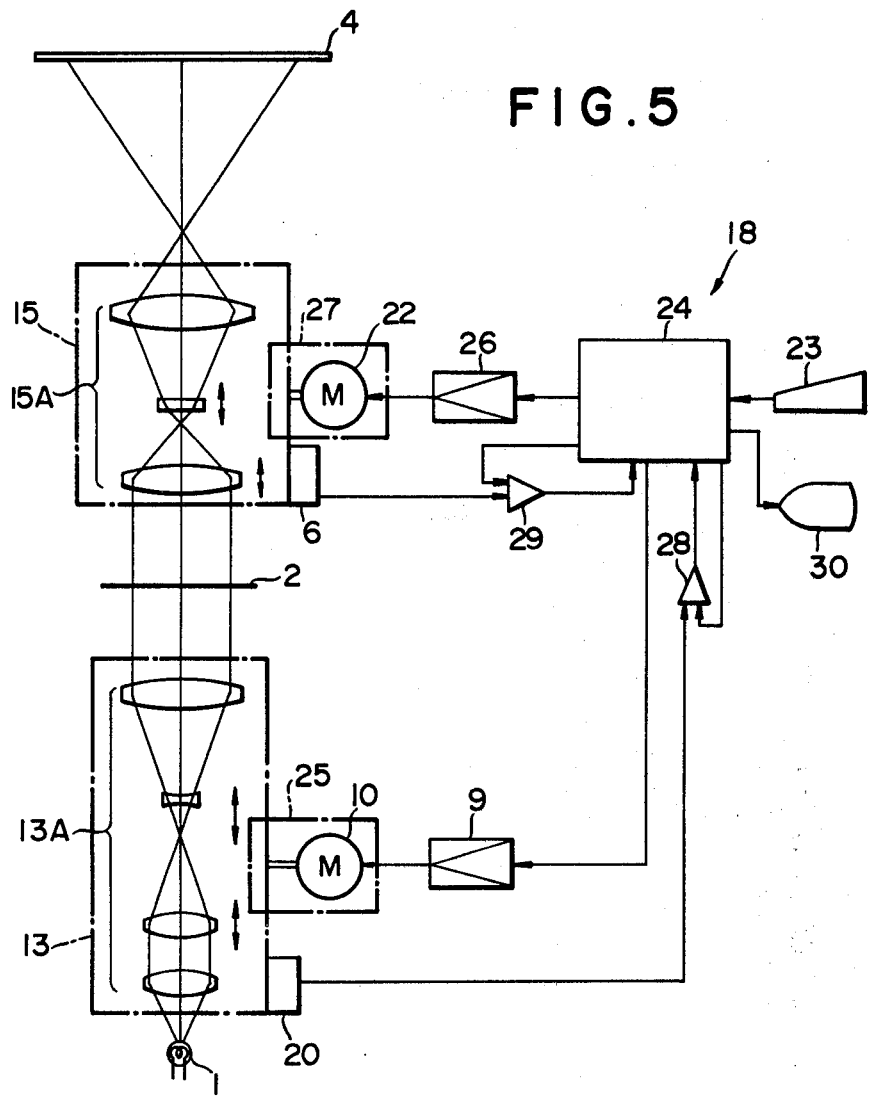
FIG. 5 is an arrangement view, showing a second embodiment of the projecting apparatus according to the present invention similarly to FIG. 2.

Description will hereunder be given of the second embodiment shown in FIG. 5.

As shown in FIG. 5, according to the present embodiment, in a projecting apparatus wherein a work on the mount 2 is illuminated by the illuminating device 13 and an image of the shape of the work obtained a light transmitted therethrough or reflected therefrom is formed on the screen 4 by means of the magnifying-projecting device 15, condensing lenses 13A in the illuminating device 13 and projecting lenses 15A in the magnifying-projecting device 15 are formed into zoom type lenses, respectively, and a tuning device 18 is provided for causing the illminating scope of the condensing lenses 13A in the illuminating device 13 to correspond to the projecting magnification of the projecting lenses 15A in the magnifying-projecting device 15.

Figure 6:
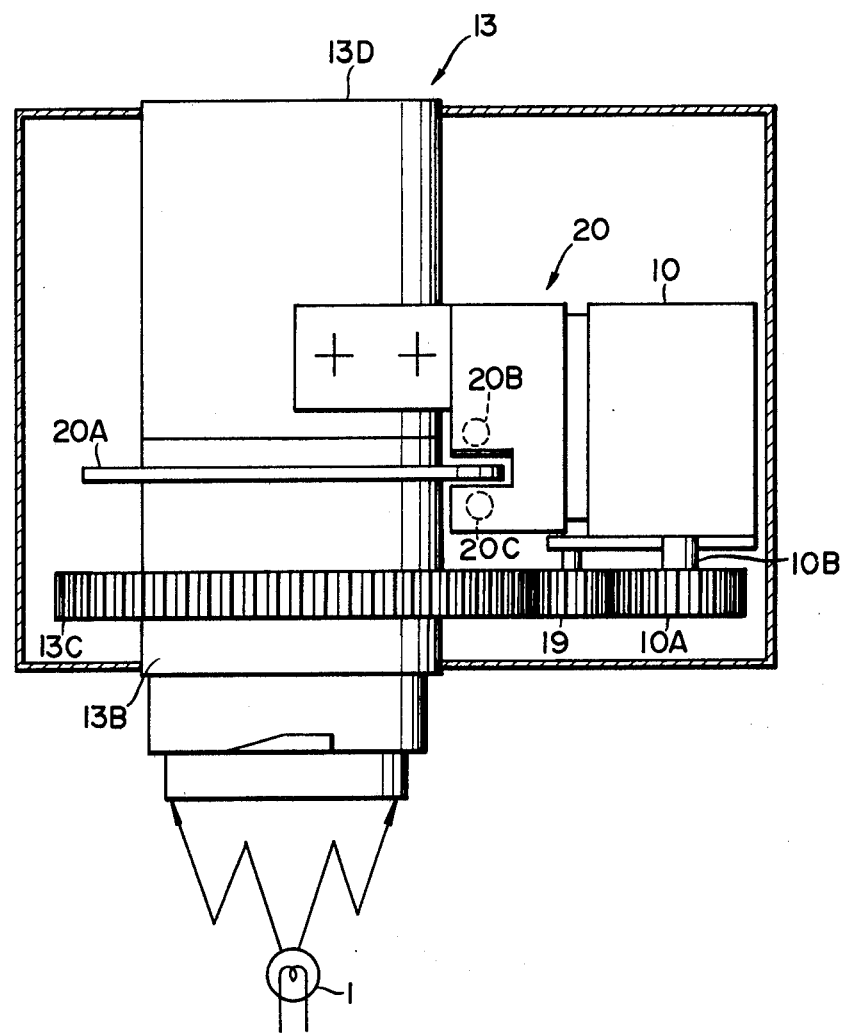
FIG. 6 is a sectional view enlargedly showing the illumination system in the second embodiment.

As shown in FIG. 6, the illuminating device 13 has the rotary lens tube 13B to drive a lens or lenses on the moving side, and the rotary lens tube 13B is coaxially, integrally provided on the outer periphery thereof with the gear 13C.

The gear 13C is in mesh with the drive gear 10A secured to an output shaft 10B of the motor 10 through an idle gear 19, whereby the rotary lens tube 13B is driven by the motor 10.

Furthrmore, the rotary lens tube 13B is secured thereto with a slit disk 20A rotatable in unison therewith. This slit disk 20A is formed in the circumferential derection thereof with an optical lattice. A light emitting element 20B and a light receiving element 20C disposed in opposed relation to the optical lattice of this slit disk 20A, and the optical lattice constitute an illuminating scope detector 20 (a photoelectric transmitting type rotary encoder), which detects a position of rotation of the rotary lens tube 13B so as to sense an illuminating scope by the condensing lenses 13A. Reference numeral 13D in the drawing indicates a stationary lens tube for the zoom type condensing lenses 13A.

Figure 7:
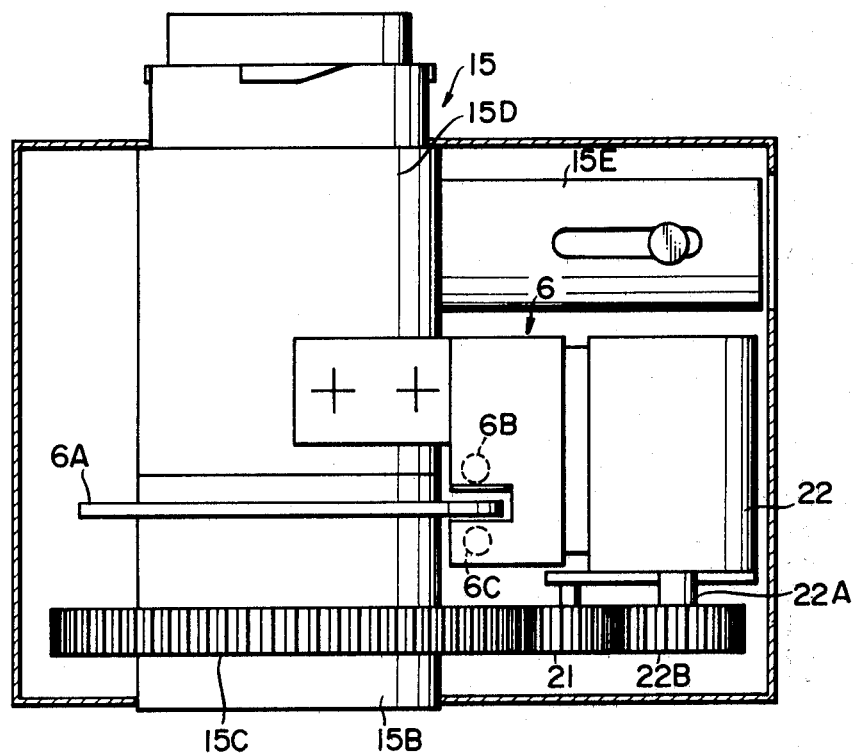
FIG. 7 is a sectional view enlargedly showing the projection system in the second embodiment.

Furthermore, as shown in FIG. 7, a gear 15C and the slit disk 6A are provided on the rotary lens tube 15B of the magnifying-projecting device 15 in the same manner as in the illuminating device 13, and the gear 15C is in mesh with a drive gear 22B secured to an output shaft 22A of a motor 22 through an idle gear 21, whereby the rotary lens tube 15B is driven by the motor 22. Additionally, the slit disk 6A, being interposed between the light emitting element 6B and a light receiving element 6C, constitutes the magnification detector 6, whereby the rotary angle of the rotary lens tube 15B is sensed, so that the magnification of the projecting lenses 15A can be detected in accordance with the rotary angle thus sensed. Reference numeral 15D indicates a stationary lens tube and 15E a reflected illuminating light receiving portion.

As shown in FIG. 5, the tuning device 18 includes: a magnification setter 23; a central processing unit 24; the amplifier 9 to amplify a control signal from this central processing unit 24 and emit the same to the motor 10; a driving device 25 including the motor 10, for driving the rotary lens tube 13B of the condensing lenses 13A; an amplifier 26 to amplify a control signal from the central processing unit 24 emit the same to the motor 22; a driving device 27 including the motor 22, for driving the rotary lens tube 15B of the projecting lenses 15A; the illuminating scope detector 20 including the slit disk 20A, the light emitting element 20B and the light receiving element 20C; a comparator 28 to compare an output signal from the illuminating scope detector 20 with a reference signal from the central processing unit 24 and emit the same to the central processing unit 24; the magnification detector 6 including the slit disk 6A, the light emitting element 6B and the light receiving element 6C; a comparator 29 to compare an output signal from the magnification detector 6 with a refernce signal from the central processing unit 24 and emit the same to the control processing unit 24; and an indicator 30 to indicate the magnification set by the magnification setter 23 in response to a signal from the central processing unit 24.

The central processing unit 24 in the tuning device 18 controls the driving device 27 to drive the rotary lens tube 15B of the projecting lenses 15A in response to a set magnification signal command signal from the magnification setter 23 and sets the magnification at a value thus commanded, and parallelly therewith, controls the driving device 25 through the amplifier 9, whereby an illuminating scope of the condensing lenses 13A is set to correspond to the magnification of the projecting lenses 15A.

Here, the detection signals from the magnification detector 6 and the illuminating scope detector 20 reach the central processing unit 24 through the comparators 29 and 28, and further, control signals are fed from the central processing unit 24 to the motors 22 and 10 to effect feedback controls.

In this embodiment, when the magnification setter 23 commands a magnification, the projecting lenses 15A and the condensing lenses 13A are tuned to be set such that a desired magnification and illuminating scope corresponding to this magnification are obtained, thereby enabling to offer the advantage that a projection inspection work and the like can be carried out quickly and easily.

Furthermore, in the above-described embodiment, both the illuminating scope of the condensing lenses 13A in the illuminating device 13 and the magnification of the projecting lenses 15A in the magnifying-projecitng device 15 are simultaneously set by the magnification setter 23, however, the illuminating scope of the condensing lenses 13A and the magnification of the projecting lenses 15A may be set such that one is followed by the other, or either the magnification or the illuminating scope may be set by manual operation.

Figure 8:
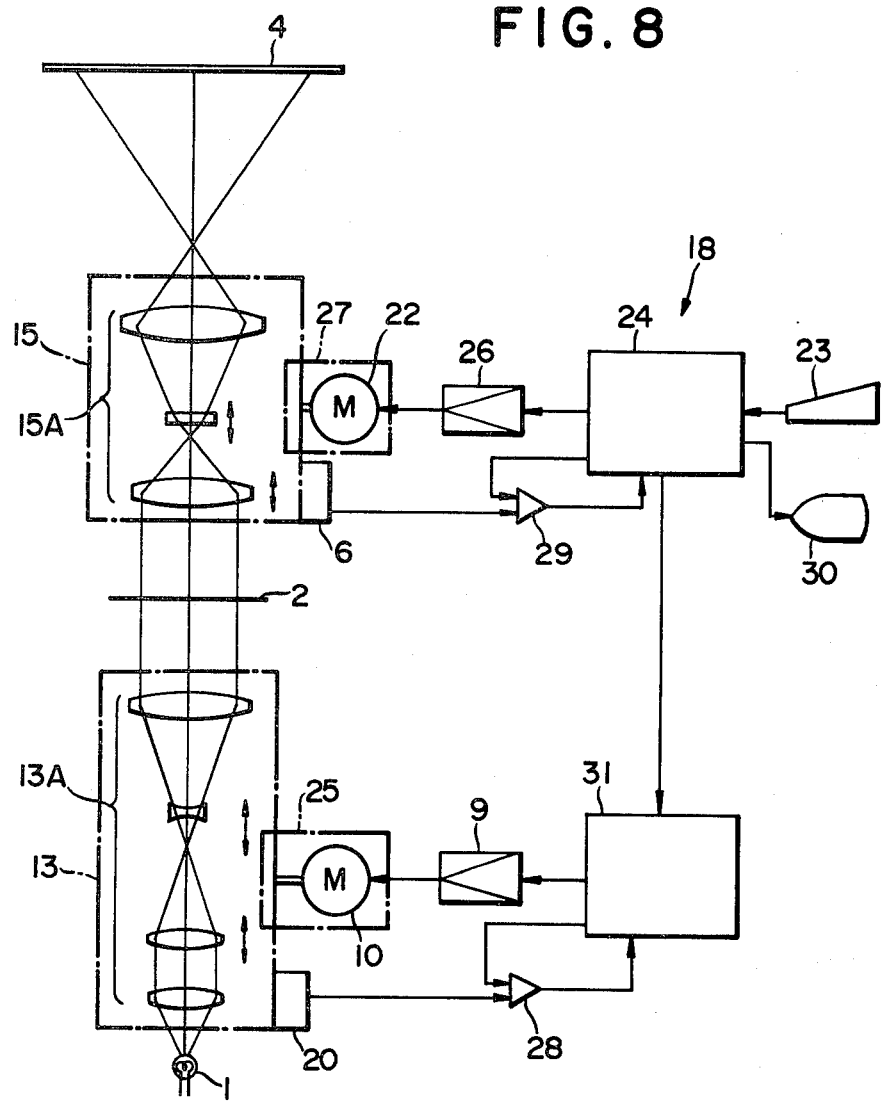
FIG. 8 through 10 are arrangement views showing a third through fifth embodiments of the projecting apparatus according to the present invention, similarly to FIG. 2.
Figure 9:
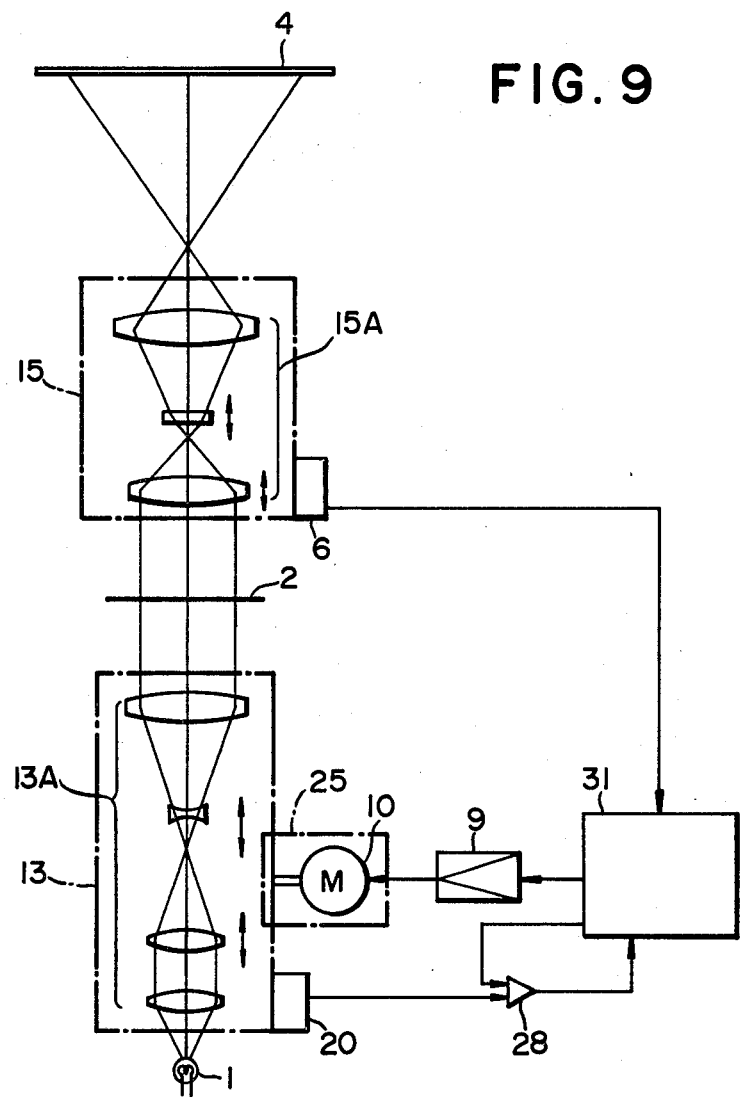
Figure 10:
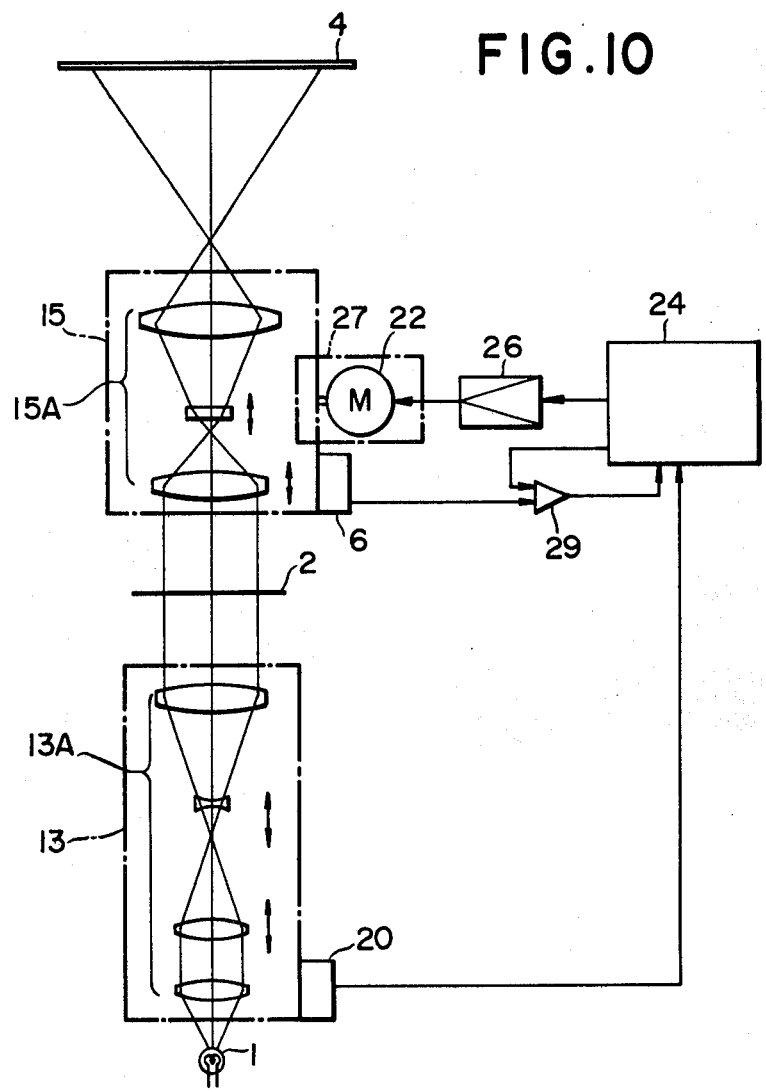

In consequence, the present invention may be of such arrangements illustrated in second through fourth embodiments shown in FIGS. 8 through 10.

FIG. 8 is an arrangement view of an optical system showing the third embodiment of the projecting apparatus according to the present invention, similarly to FIG. 2.

In constrast to the second embodiment shown in FIG. 5, where the projecting lenses 15A and the condensing lenses 13A are parallelly set in magnification and illuminating scope by the magnification setter 23, in this second embodiment, firstly, magnification of the projecting lenses 15A are set by the magnification setter 23, and thereafter, an illuminating scope of the condensing lenses 13A is set in accordance with this magnification. Namely, the illuminating scope of the condensing lenses 13A are cascade-controlled by a central processing unit 31 on the side of the condensing lenses 13A in accordance with the magnification of the projecting lenses 15A.

Since other respects in the arrangement are identical with those in FIG. 5, same reference numerals are used to designate same or similar parts and description thereof will be omitted.

As compared with the second embodiment shown in FIG. 5, in the third embodiment, the magnification of the projecting lenses 13A is set in the first place, and thereafter, the illuminating scope of the condensing lenses 15A is controlled in accordance with the actual magnification, thus enabling to offer the advantage that a possibility of occurrence of hunting in the control system can be eliminated.

Description will hereunder be given of the fourth embodiment shown in FIG. 9.

In this fourth embodiment, the rotary lens tube 15B of the projecting lenses 15A is manually operated, the magnification at this time is detected by the magnification detector 6 and the driving device 25 is controlled by the central processing unit 31 in accordance with the value detected in the same manner as in the embodiment shown in FIG. 8, whereby the rotary lens tube 13B of the condensing lenses 13A is controlled so that an illuminating scope corresponding to the magnification of the projecting lenses 15A can be obtained.

Description will hereunder be given of the fifth embodiment shown in FIG. 10.

In contrast to the fourth embodiment shown in FIG. 9, in this fifth embodiment, the rotary lens tube 13B of the condensing lenses 13A is manually operated, the illuminating scope at this is detected by the illuminating scope detector 20, the driving device 27 is controlled by the central processing unit 24 in accordance with the value thus detected so that magnification of the projecting lenses 15A corresponding to the illuminating scope of the condensing lenses 13A can be obtained.

Same reference numerals are used to designate same or similar parts as shown in FIGS. 5, 8 and 9 and description thereof will be omitted.

Additionally, in the above-described embodiment, since the condensing lenses 13A and the projecting lenses 15A are adjusted in zoom ratio by rotational driving of the rotary lens tube 13B or 15B, the driving is effected by the motor 10 or 22 through gears. However the zoom ratio between the condensing lenses 13A and the projecting lenses 15A may be adjusted by any other means. In consequence, movable portions of the zoom lenses may be made movable in a rectilinear direction.

Furthermore, detection of the illuminating scope of the condensing lenses 13A and the magnification of the projecting lenses 15A has been made by the photoelectric transmitting type rotary encoders, however the invention should not necessarily be limited to this specific form shown in the embodiments as far as a detecting device capable of detecting the illuminating scope and the magnification. In consequence, the magnification detector 6 or the illuminating scope detector 20 in the above-described embodiment may be replaced by a rectilinear type encoder when the lens tube of the projecting lenses 15A or the condensing lenses 13A is of a rectilinear type, or which an detect the set magnification of the projecting lenses 15A or the condensing lenses 13A by a rotary encoder or a rectilinear type encoder when the aforesaid lens tube is of a helicoidal rotation. Or, the magnification detector 6 or the illuminating scope detector 20 may be replaced by a light quantity detecting device to detect a light quantity variable in accordance with a distance covered by a movement of the projecting lenses 15A or the condensing lenses 13A for example, a magnetic reading type detecting device, an electrostatic capacity type detecting device or the like.

It should be apparent of those skilled in the art that the above described embodiments are merely representative, which represent the appilications of the principles of the present invention. Numerous and varied other arrangements can be readily devised by those skilled in the art without departing from the spirit and the scope of the invention.

What is claimed is:

1. A projecting apparatus wherein a work on a mount is illuminated by an illuminating device and an image of the shape obtained through a light transmitted therethrough or a light reflected therefrom is formed on a screen by means of a magnifying-projection device, characterized in that a condensing lenses in the illuminating device and a projecting lenses in the magnifying-projection device are formed into zoom type lenses and a tuning device is provided for causing the illuminating scope of the condensing lenses in the illuminating device to correspond to the projecting magnification of the projecting lenses in the magnifying-projecting device, the tuning device comprising:
    a magnification setter for generating a magnification signal:
    an actuator to actuate the projecting lenses in response to said magnification signal from the magnification setter;
    a detecting device secured to the projecting lenses actuated by the actuator, for detecting a magnification thereof and for generating a detection signal; and
    actuator to actuate the condensing lenses in response to said detection signal from the detecting device, and to set a magnification corresponding to the magnification thus detected.

2. A projecting apparatus wherein a work on a mount is illuminated by an illuminating device in an image of the shape of the work obtained through a light transmitted therethrough or reflected therefrom is formed on a screen by means of a magnifying-projecting device, characterized in that condensing lenses in the illuminating device and projecting lenses in the magnifying-projecting device are formed into zoom type lenses and a tuning device is provided for causing the illuminating scope of the condensing lenses in the illuminating device to correspond to the projecting magnification of the projecting lenses in the magnification-projecting device, the tuning device comprising:
    a detecting device secured to the projecting lenses, for detecting an illuminating scope and for generating a detecting signal; and
    an actuator to actuate the condensing lenses in response to said detection signal from the detecting device, and to set an illuminating scope corresponding to the illuminating scope thus detected.

3. A projecting device wherein a work on a mount is illuminated by an illuminating device and an image of the shape obtained through a light transmitted therethrough or reflected therefrom is formed on the screen by means of a magnifying-projecting device characterized in that condensing lenses in the illuminating device and projecting lenses in the magnifying-projecting device are formed into zoom type lenses and a tuning device is provided for causing scope of the condensing lenses in the illuminating device to correspond to the projecting magnification of the projecting lenses in the magnifying-projecting device, the tuning device comprising:
    a detecting device secured to the condensing lenses, for detecting an illuminating scope and for generating a detection signal; and
    an actuator to actuate the projecting lenses in response to said detection signal from the detecting device, and to set an illuminating scope coresponding to the illuminating scope thus detected.

4. A projecting apparatus as set forth in claim 1, 2 or 3, wherein, the signal from the detection device is fed to the actuator after said detection signal from the detecting device to a detect an illuminating scope has been compared with said magnification signal by a comparator.

5. A projecting device wherein a work on a mount is illuminated by an illuminating device in an image of the shape of the work obtained through a light transmitted therethrough or reflected therefrom is formed on a screen by means of a magnifying-projecting device, characterized in that condensing lenses in the illuminating device and projecting lenses in the magnifying-projecting device are formed into zoom type lenses and a tuning device is provided for causing the illuminating scope of the condensing lenses in the illuminating device to correspond to the projecting magnification of the projecting lenses in the magnifying-projecting device, the tuning device comprising:
    a detecting device secured to the condensing lenses, for detecting a magnification and for generating a detection signal; and
    actuator to actuate the projecting lenses in response to said detection signal from the detecting device, and to set a magnification corresponding to the magnification thus detected.

6. A projecting device wherein a work on a mount is illuminated by an illuminating device in an image of the shape of the work obtained through a light transmitted therethrough or reflected therefrom is formed on a screen by means of a magnifying-projecting device, characterized in that condensing lenses in the illuminating device and projecting lenses in the magnifying-projecting device are formed into zoom type lenses and a tuning device is provided for causing the illuminating scope of the condensing lenses in the illuminating device to correspond to the projecting magnification of the projecting lenses in the magnifying-projecting device, the tuning device comprising:

a magnification setter for generating a magnification signal;

an actuator to actuate the projecting lenses in response to said magnification signal from the magnification setter;

a detecting device secured to the projecting lenses actuated by the actuator, for detecing and illuminating scope thereof and for generating a detection signal; and an actuator to actuate the condensing lenses in response to the detection signal from the detection device, and to set an illuminating scope corresponding to the illuminating scope thus detected.

7. A projecting apparatus wherein a work on a mount is illuminated by an illuminated device in an image of the shape of the work obtained through a light transmitted therethrough or reflected therefrom is formed on a screen by means of a magnifying-projecting device characterized in that condensing lenses in the illuminating device and projecting lenses in the magnifying-projecting device are formed into zoom-type lenses and a tuning device is provided for causing the illuminating scope of the condensing lenses in the illuminating device to correspond to the projecting magnification of the projecting lenses in the magnifying-projecting device, the tuning device comprising:

a magnification setter for generating a magnification signal;

an actuator to actuate the condensing lenses in response to said magnification signal from the magnification setter a detecting device secured to the condensing lenses actuated by the actuator for detecting a magnification thereof and for generating a detection signal; and an actuator to actuate the condensing lenses in response to said detection signal from the detection device, and to set a magnification corresponding to the magnification thus detected.

8. A projecting apparatus wherein a work on a mount is illuminated by an illuminating device in an image of the shape of the work obtained through a light transmitted therethrough or reflected therefrom is formed on the screen by means of a magnifying-projecting device, characterized in that condensing lenses in the illuminating device and projecting lenses in the magnifying-projecting device are formed into zoom-type lenses and a tuning device is provided for causing the illuminating scope of the condensing lenses in the illuminating device to correspond to the projecting magnification of the projecting lenses in the magnifying-projecting device, the tuning device comprising:

a magnification setter for generating a magnification signal;

an actuator to actuate the condensing lenses in response to said magnification signal from the magnification setter;

a detecting device secured to the condensing lenses actuated by the actuator, for detecting illuminating scope thereof and for generating a detection signal; and an actuator to actuate the projecting lenses in response to the detection signal from the detecting device, and to set an illuminating scope corresponding to the illuminating scope thus detected.

9. A projecting apparatus as set forth in claim 1, 2, 5, 3, 6, 7 or 8, wherein the signal from the detecting device is fed to the actuator after a detection signal from the detecting device to detect a magnification has been compared with said magnification signal by a comparator.

* * * * *